(12) United States Patent
Aamand

(10) Patent No.: US 8,210,317 B2
(45) Date of Patent: Jul. 3, 2012

(54) LUBRICATING APPARATUS FOR A DOSING SYSTEM FOR CYLINDER LUBRICATION OIL AND METHOD FOR DOSING CYLINDER LUBRICATING OIL

(75) Inventor: Jan Aamand, Vojens (DK)

(73) Assignee: Hans Jensen Lubricators A/S, Hadsund (DK)

( * ) Notice: Subject to any disclaimer, the term of this patent is extended or adjusted under 35 U.S.C. 154(b) by 587 days.

(21) Appl. No.: 12/309,304

(22) PCT Filed: Jul. 19, 2007

(86) PCT No.: PCT/DK2007/000364
§ 371 (c)(1),
(2), (4) Date: Jan. 13, 2009

(87) PCT Pub. No.: WO2008/009291
PCT Pub. Date: Jan. 24, 2008

(65) Prior Publication Data
US 2010/0006056 A1     Jan. 14, 2010

(30) Foreign Application Priority Data

Jul. 21, 2006  (DK) .................................. 2006 01005

(51) Int. Cl.
F01M 1/04     (2006.01)
B63H 21/18    (2006.01)
(52) U.S. Cl. ...... 184/6.8; 184/6.5; 123/196 R; 440/88 L
(58) Field of Classification Search .................... 184/6.5, 184/6.8, 55.1; 123/196 R, 196 CP, 196 W; 440/88 L; 60/39.01–806; 114/1–382
See application file for complete search history.

(56) References Cited

U.S. PATENT DOCUMENTS

| 6,058,900 | A * | 5/2000 | Kusche et al. .......... 123/196 CP |
| 6,547,038 | B1 * | 4/2003 | Thomsen et al. .............. 184/6.8 |
| 6,928,975 | B2 * | 8/2005 | Lauritsen .................. 123/196 R |
| 7,171,451 | B2 * | 1/2007 | Defosse ........................ 709/208 |
| 2004/0026174 | A1 * | 2/2004 | Lauritsen ....................... 184/6.8 |
| 2010/0162989 | A1 * | 7/2010 | Aamand et al. ........... 123/196 R |

(Continued)

FOREIGN PATENT DOCUMENTS

CH     673 506     3/1990

(Continued)

*Primary Examiner* — Michael Mansen
*Assistant Examiner* — Robert Reese
(74) *Attorney, Agent, or Firm* — James Creighton Wray

(57) ABSTRACT

There is disclosed a method and a hydraulic lubricating apparatus for dosing cylinder lubricating oil. The dosing system includes a supply line and a return line connected with the lubricating apparatus via each one or more valves for supplying hydraulic oil, a central hydraulic oil feed pump connected with hydraulic cylinders, each having a hydraulic piston and which may be subjected to pressure by hydraulic oil via the supply line, a number of injection units corresponding to a multiple of the cylinder number in the engine and which are connected with each their dosing cylinder with a dosing piston and a supply line for cylinder lubricating oil. In order to provide a system which is reliable and cheap and where there is no risk of disruptions, even if a hydraulic cylinder fails, the lubricating apparatus is designed with a distributor plate which at one side is in contact with the dosing pistons and which at its other side is in contact with two or more hydraulic pistons for displacing the distributor plate for activating the dosing pistons.

15 Claims, 15 Drawing Sheets

U.S. PATENT DOCUMENTS

2010/0229823 A1 * 9/2010 Gibson et al. ............ 123/196 R

FOREIGN PATENT DOCUMENTS

| | | |
|---|---|---|
| DK | 172845 | 3/1997 |
| DK | 173512 | 12/1999 |
| EP | 1 426 571 | 6/2004 |
| GB | 834533 | 5/1960 |
| WO | WO 02/35068 | 5/2002 |
| WO | WO 2006/002632 | 1/2006 |

* cited by examiner

LUBRICATING APPARATUS FOR A DOSING SYSTEM FOR CYLINDER LUBRICATION OIL AND METHOD FOR DOSING CYLINDER LUBRICATING OIL

This application claims the benefit of Danish Application No. PA 2006 01005 filed Jul. 21, 2006 and PCT/DK2007/000364 filed Jul. 19, 2007, which are hereby incorporated by reference in their entirety.

FIELD OF THE INVENTION

The present invention concerns a hydraulic lubricating apparatus for a dosing system for cylinder lubricating oil, e.g. in marine engines, the dosing system including
- a supply line and a return line connected with the lubricating apparatus via one or more valves for supplying hydraulic oil;
- a central hydraulic oil feed pump which via the supply line is connected with hydraulic cylinders each having a hydraulic piston and which may be subjected to pressure by hydraulic oil;
- a number of injection units corresponding to a multiple of the cylinder number in the engine, and which are connected with each their dosing cylinder with a dosing piston;
- a supply line for cylinder lubricating oil;
- a distributor plate which at one side is in contact with the dosing pistons.

Moreover, the invention concerns a method for a dosing cylinder lubricating oil, e.g. in marine engines, the method including:
- supplying hydraulic oil pressure via a feed and a return of hydraulic oil to and from a lubricating apparatus by using a hydraulic oil supply system connected with hydraulic cylinders that each has a hydraulic piston and which is subjected to pressure by the hydraulic oil;
- supplying and injecting cylinder lubricating oil via a number of injection units corresponding to a multiple of the cylinder number in the engine, which injection units being connected with each their dosing cylinder with a dosing piston;
- that a distributor plate at one of its sides is brought into contact with the dosing pistons.

It is noted that in the present application cylinder lubricating oil and hydraulic oil are mentioned. However, they may not be two different kinds of oil. It may be one and the same oil used for lubrication and for hydraulic operation. This oil can be supplied by the same source.

BACKGROUND OF THE INVENTION

Lubricating apparatuses are traditionally designed as pumping units which are mounted in close association with respective cylinders and which are connected with a feeding reservoir for lubricating oil and with lubricating points in the form of oil injection nozzles at different points on the cylinder wall. Each pump unit includes a plurality of reciprocating pumps that feed various lubricating points with oil and which are driven by a common rotating control shaft with cams provided thereon. By the rotation of the shaft, the cams with pressing heads act on respective axially displacing pistons which are spring biased in direction towards the control shaft, so that the pistons at the rotation of the shaft will perform reciprocating movements for activating the pistons of the reciprocating pumps.

For many years, lubricating apparatuses have operated under the condition that the discharge pressure from the piston pumps was not to be very great, as it is a fixed standard that the oil is to be injected into the cylinder during the upwards return stroke of the engine piston, i.e. during the compressing action, however before the subsequent power stroke by the ignited combustion. Hereby, it has been necessary to operate with injection or pump pressures of the magnitude 10 bar.

In recent years it has been proposed to increase the efficiency of the lubrication by injecting the oil through pressurized atomizing nozzles for achieving oil mist lubrication during the upwards movement of the piston. However, hereby the oil is applied a far higher pressure for ensuring fine atomization through atomizing nozzles, e.g. a pressure up to 100 bar or more.

Furthermore, in recent years there has been a tendency that electronically based diesel engines are produced to a wider extent, and on these engines the mechanical drives traditionally used for driving mechanical lubricating apparatuses have been removed.

Lubricating points will thus, as mentioned in the present application, include oil injecting nozzles and/or pressurized atomizing nozzles.

In both systems, the control shaft is driven through a direct or indirect mechanical coupling with the crankshaft of the engine, whereby it is possible to provide power for the activation of pumps and at the same time to achieve synchronization between the crankshaft of the engine and the control shaft of the lubricating apparatus.

A pump unit may e.g. include a box-shaped apparatus housing, from where connecting pipes extend to the lubricating points on the associated engine cylinder, e.g. in a number of 6-24.

The pistons are traditionally operated by means of activation cams/rocker arms on a through-going control shaft which is rotated synchronously with the crankshaft of the engine. The pistons are spring biased towards the activation cams. There is provided a set screw defining the extreme position of an associated activation cam. The set screws may be operated for determining individual operative strokes of the pistons and thereby the associated yield of the individual piston pumps.

By lubrication according to the invention, it is possible for the user to operate with controlling injection timing for a synchronized lubrication, which is timed according to the rotation of the crank, or an unsynchronized cylinder lubrication, i.e. a cylinder lubrication that does not depend on the rotation and angular position of the crank.

Furthermore, there is an increasing demand for a flexible and easy adjusting of the controlled feeding cylinder lubrication oil portion for the immediate demand of the engine depending on diverse measurable engine parameters. It is also desirable to adjust the timing concurrently with the actual operating situation of the engine in a flexible way. All these adjustments are preferably to be controlled centrally.

Driving the lubricating apparatuses synchronously with the engine speed is electronically feasible, but extensive and costly. With such a system, the timing can be changed immediately. Changing the dosed cylinder lubricating oil portion is, however, more difficult to control.

As the cylinder lubricating oil is typically to be dosed with one portion per engine revolution, the only possibility of adjusting the dosage is to change the stroke of the pumps. A system for this purpose is e.g. described in DK patent application 4998/85. This system is operated by a cam disk mechanism for adjusting the pump stroke in dependence on the engine load. Changing this dependence may only be effected by replacing the cam disks with other cam disks with a different transfer function.

It has also been proposed to adjust the pump stroke by means of a controllable motor, e.g. a step motor. This has been used for point lubrication, but it is difficult to establish in connection with conventional lubricating apparatuses. Such a system is e.g. disclosed in International patent application WO 02/35068 A1.

Furthermore, from DE 28 27 626 there is known a lubricating system based on lubricating oil supplied in measured quantities for predetermined time intervals through openings in the cylinder wall. Here, there is not indicated any possibility of a stepless controlling of the dosing to be performed at the individual lubricating points.

Furthermore, from GB 834533 A, DK 173512 B1 or CH 673506 A5 systems of the type mentioned in the introduction are known, where a hydraulic cylinder via a distributor plate or similar structure acts on a plurality of dosing pistons. In these designs, there will be one hydraulic cylinder for the activation. This will cause disruption of operation for all dosing pistons if the hydraulic cylinder fails.

In connection with traditional cylinder wall lubrication, it has hitherto been the practice to use simple spring-biased non-return valves that can resist the internal pressure in the cylinder, but which yield to a slightly higher external injection pressure. However, in connection with pressurized atomized injection, it is desirable and necessary that the valve system opens only at a much higher oil pressure in order that the oil injection can assume the character of a pressurized atomizing injection right from the beginning. We are hereby speaking of a pressure differential factor of up to several hundred percent.

In DK patent application PA 2005 01629 it has previously been proposed with a hydraulically powered lubricating apparatus and a method for dosing cylinder lubricating oil of the type mentioned in the introduction. By the principle described in the mentioned patent application it is possible to establish the cylinder lubrication in a way so that there may be achieved a flexible electronic control and a central stepless control of the dosing to the lubricating points. Furthermore, there may also be attained precise and simple control of the timing.

This may be achieved by using a special setting unit with setting means engaging the dosing pistons and which is connected with a controllable actuator/motor for adjusting the setting unit.

It is possible to combine the technical effect from DK patent application PA 2004 01035, which describes an apparatus where regulation is performed by using a suitable number of valves for optional shutting off system oil to a dosing unit, with the technical effect of the present invention in order thereby to provide a system with two alternative possibilities for regulating the amount of lubricating oil.

The contents of the two above mentioned DK patent applications PA 2005 01629 and PA 2004 01035 are incorporated by reference.

The present invention may thus be used in connection with method and apparatus as described in the mentioned DK patent application.

However, the present invention may also be used in connection with other kinds of lubricating apparatuses and other methods where hydraulic lubrication using hydraulic pistons is applied for acting on injection units that include dosing pistons for the cylinder lubricating oil.

OBJECT OF THE INVENTION

It is the object of the present invention to indicate a method and a hydraulically driven lubricating apparatus with which it is possible to provide a very reliable and cheap system, where the risk of malfunction is reduced.

DESCRIPTION OF THE INVENTION

The lubricating apparatus according to the invention is peculiar in that the distributor plate is in contact with two or more hydraulic piston at its other side for displacing the distributor plate for actuating the dosing pistons.

The method according to the invention is peculiar in that the distributor plate is brought into contact with two or more hydraulic pistons at its other side for displacing the distributor plate for actuating the dosing pistons.

In general, the lubricating apparatus and the method operates in that a minimum of two hydraulic cylinders are in contact with the distributor plate which, due to the contact with the dosing pistons, actuate these so that a measured injection of lubricating oil is discharged into the cylinder via the injection unit. In principle, a number of mutually independent hydraulic cylinders are thus used for actuating the dosing pistons. Hereby is achieved a more dependable solution than in a situation where one hydraulic cylinder/one hydraulic piston is used for actuating one or more dosing pistons.

Furthermore, it is also possible to achieve a cheaper technical solution as a lubricating apparatus can be made more compact, and as the number of monitoring sensors may be kept down. In principle, one monitoring sensor may be used for detecting the movement of the distributor plate. This is advantageous compared with prior art systems where there has been a need for a monitoring sensor for detecting the displacement of each hydraulic piston/dosing piston in order to supervise if the one of the injection units fails.

The system according to the invention may be combined with adjusting the amount of dosed lubricating oil to the lubricating points and the timing, as described in the above mentioned DK patent application. Hereby, the advantages of the present invention are combined with the advantages of the precise control of the lubricating oil amount and the timing for discharging the lubricating oil portion, as a set of valves may be controlled for every point in the timing/time of lubrication and hence also the delivery of system/hydraulic oil for carrying through the stroke of the dosing piston at a predetermined point in time. One may thus apply and stop applying a system pressure on a hydraulic piston, or on a group of hydraulic pistons at the same time, with one or more sets of valves which are preferably provided in the form of solenoid valves.

In the apparatus according to the invention it is possible to combine groups of hydraulic pistons, where each group consists of minimum two hydraulic pistons. A solution may thus be provided with one, two or more groups of hydraulic pistons. The groups of hydraulic pistons are preferably arranged mutually independent so that failure of one group does not produce disruptions in the operation of the other groups. Typically, the groups operate one by one, and in case of failure one may thus disconnect the failing group and activate another group.

An embodiment of a lubricating apparatus according to the invention is peculiar in that the distributor plate is supported by three or more hydraulic pistons. Hereby may be achieved that in case of failure of one of the hydraulic cylinders, no disturbances in operation or displacement of the distributor plate will occur in its direction of displacement which will preferably be provided perpendicularly to the hydraulic cylinders. The hydraulic cylinders will usually be provided with displacement which is mutually parallel and perpendicular to a plane distributor plate.

If a fault occurs in one of the hydraulic cylinders, the system may be adapted so that the distributor plate may be displaced across its entire surface in the direction of displacement in parallel with the displacement of the hydraulic pistons. This may e.g. be effected by disposing the plate in guides in a slide chamber, or alternatively the plate may be made with a certain height so that it cannot "capsize" in a slide chamber or guide in which it is disposed.

A further embodiment of the lubricating apparatus according to the invention is peculiar in that the dosing pistons are disposed in parallel with each other and that the distributor plate is displaced in direction perpendicular to the dosing pistons. As well as the hydraulic pistons are disposed mutually in parallel, in preferred embodiments the dosing pistons will also be disposed in parallel with orientation of their longitudinal axes perpendicularly to the distributor plate in direct continuation of the orientation of the dosing pistons, and therefore with a travel corresponding to the travel with which the hydraulic pistons are displaced.

Irrespectively of the number of dosing pistons and hydraulic pistons, there is achieved an advantage in that they are placed in contact with the distributor plate. As a contact is established which is not a permanent connection, there will be less need for tolerances for the alignment of cylinder chambers for receiving the dosing pistons and cylinder chambers for receiving the hydraulic pistons.

If lesser tolerances in linearity occurs, the significance thereof will not cause tearing or unnecessary wear because of the distributor plate which may be said in principle to lie loosely between the contact with the dosing pistons and the hydraulic pistons.

According to a further embodiment, the lubricating apparatus according to the invention is peculiar in that it includes at least one monitoring sensor for registering the displacement of the distributor plate and/or accomplished dosing of cylinder lubricating oil portion.

By using only one monitoring sensor it becomes possible to perform detection of correctly discharged amount of lubricating oil. This may be detected in a computer system/electronic control unit used for controlling, monitoring and/or detecting the functions of the lubricating apparatus.

The monitoring sensor may include monitoring means based on flow measurement, e.g. by using a rotor in the flow, or a ball that is lifted by the flow, or monitoring means based on measuring the movement of the dosing piston. The monitoring may also be based on a combination of these measurements.

As mentioned above, according to the invention there will preferably be provided a computer system. According to an embodiment of the lubricating apparatus according to the invention, this computer system may include:
 a decentralized computer for controlling timing and stroke setting for the dosing units in an associated cylinder block; and
 a central computer, which preferably includes a main computer and a backup computer, for adjusting relevant operation data, monitoring, logging etc.

The decentralized computer is thus used for controlling timing and stroke length setting for the dosing units in an associated cylinder block. Control of the stroke setting is thus established via a control via the controllable motor that regulates the angular position of the eccentric shaft, thereby setting a desired cylinder lubricating oil volume. Control of the timing is effected via the valves, as these may be opened/closed, thereby providing connection and disconnection of a system pressure on the system oil on the hydraulic pistons at any point of time for lubrication.

By this solution with a hydraulic lubricating apparatus, one may thus adjust the stroke and the timing electronically, and it is thus possible to use arbitrary stroke lengths/points of time. This is possible as the hydraulic lubricating apparatus uses the hydraulic/system oil which via the valves performs the stroke at a predetermined point of time which is controlled electronically so that a largely stepless adjusting of the amount of lubricating oil fed to each cylinder in a single pump stroke for the lubricating apparatus may be achieved in a electronically controlled way.

Thus it is possible to have several sets of valves (e.g. solenoid valves) and to let several groups of lubricating points have their own timing in all cylinders or only in some of the cylinders. By embodiments shown in the enclosed drawings there is described a solution where the stroke may be adjusted for all. However, it is noted that an alternative embodiment may include that adjustment of the height of the setting means for any of the above mentioned groups of lubricating points is enabled. This may e.g. be effected by using a spacer or plate device which via a conical screw may provide a displacement in height of the setting means. During a cycle there may thus be performed a cyclical blocking of a group of lubricating points for a cylinder and/or a cyclical blocking of a set of valves.

In an alternative embodiment, the lubricating apparatus may include a plurality of pumping units that each have their own adjustment of the stroke and each their own solenoid valve control. In that way, the number of components can be kept down, for example, one accumulator per pump unit is not required. In this embodiment, one may suffice with one accumulator per lubricating apparatus. The piping furthermore becomes more simple as there will be need for fewer pipes between fewer components.

The apparatus according to the invention may be used for traditional lubrication by using non-return valve and accumulator at the injection point and for e.g. SIP lubrication. The advantage of the invention and possibilities of saving would be equally attractive irrespective of the lubrication principle.

According to the present invention it will be possible to provide only one monitoring sensor for detecting the displacement of the distributor plate. Such a sensor may in principle be disposed centrally in relation to the distributor plate.

Alternatively, several sensors may be used distributed across the face of the distributor plate, so as to ensure that the planned linear movement is performed.

If a plurality of sensors distributed across the face of the distributor plate are used, it is possible at the same time to ascertain if a true linear displacement of the entire distributor plate has been performed, or if the distributor plate tilts during the displacement. This may e.g. be the case if one or more of the hydraulic pistons fail. In other words, by using several sensors there may be performed detection that can be used for determining possible functional failure in one or more of the hydraulic pistons.

Typically, there will be one lubricating apparatus per cylinder. However, it is possible to section a lubricating apparatus so that it is possible to mount several sets of solenoid valves, and in this way to provide the possibility of different activating times. This enables a lubricating apparatus to feed a plurality of cylinders.

Various systems may be provided for adjusting the length of the stroke. Thus there may be a superior adjustment of stroke length with a setting means that includes an eccentric shaft whereby the stroke can be adjusted in common for all dosing units in a cylinder block. Besides, it is also possible to reset the stroke length as well as to enable performing the above mentioned adjusting of the height of the setting means.

Typically, a hydraulic lubricating apparatus will have up to 12 lubricating points which may be sectioned in e.g. groups of two or three, so that possible failing blocks can be readily replaced. In principle, all lubricating points can be gathered in one section. Lubricating apparatuses with more than 12 lubricating points will also be possible. In these cases, it is preferred to fit more accumulators or possibly larger accumulators for lubricating oil.

In order that the decentralized computers can monitor the function of the lubricating apparatus, there is possibility of monitoring the correct "striking" of the individual lubricating apparatuses and of monitoring that enough lubricating oil is present.

According to a preferred embodiment, detection of the displacement of the distributor plate will be performed with a sensor giving off signal when the distributor plate has performed a stroke, preferably by detecting when the distributor plate is situated at a top position. Correspondingly, it will also be possible to mount a sensor at each lubricating point if desired.

Moreover, at the same time there is possibility to mount a level alarm on the lubricating apparatus itself. The level alarm may either be mounted directly in the apparatus or on the supply tank for the latter.

As an alternative to the described flow-monitoring, it is possible to transfer the flow-monitoring principle known from mechanical lubricating apparatuses. By means of an induction sensor, a steel ball will thus be detected—when no flow is present, the ball "falls to the bottom", activating the alarm.

According to a further embodiment, the lubricating apparatus according to the invention is peculiar in that all the hydraulic cylinders are connected to the same central hydraulic oil feed pump. This provides a particularly simple and cheap system. This embodiment will also include systems where an existing hydraulic system (common rail) is used/shared. Alternatively, it is possible to combine a separate oil supply or hydraulic pump with an already existing pump so that they each control their own group of hydraulic pistons.

Alternatively, it will also be possible to use several independent feed pumps for hydraulic oil, each powering groups of hydraulic pistons. It that way there may be achieved a more sure operation/movement of the distributor plate. Thus it may e.g. be possible to apply such a principle for operating with a plurality of solenoid valves. If one of the solenoid valves gets a "fault", this will mean nothing to the operation as one or more other solenoid valves may stand in for a malfunctioning solenoid valve. The lubricating apparatus may according to a further embodiment thus be peculiar in that the hydraulic cylinders are arranged in groups connected with each their separate hydraulic oil feed pump.

Even in a situation where a solenoid valve gets stuck in an open position, it is possible to make a switching so that the lubricating apparatus can operate with the other solenoid valve/group, as a switch valve ensures pressure relief of the first solenoid valve.

The solution may both be used for systems with own hydraulic station, alternatively already available hydraulic sources may be used. The latter may entail that operation is to be performed at a different operational pressure, and this will require that the diameters of the hydraulic pistons are adapted so that the dosing pistons receive the same action of force.

A solution where a stand-alone hydraulic station is combined with an available pressure source would also be possible if one lets each pressure source drive its own group of hydraulic pistons.

According to yet an embodiment, the lubricating apparatus according to the invention is peculiar in that it includes an adjusting unit with a setting means which via a set pin/set screw engages the distributor plate and thereby the dosing pistons in order thereby to adjust the volume of injected cylinder lubricating oil at each lubricating stroke, and a controllable actuator/motor engaging the setting means for setting the latter.

Alternatively, it is possible to adjust the stroke by means of the setting unit. This may be effected by an arrangement with a motor which via a coupling, e.g. a worm drive, adjusts the stroke by changing the position of a set pin/set screw. In this embodiment, it is possible to adjust the stroke by changing the position of the set screw.

The stroke length may be adjusted simultaneously for all lubricating points, however, possibly with individual adjusting of individual lubricating points. The common adjusting of the stroke is performed electronically controlled by the decentralized computer which is connected with and controls one or more motors, e.g. DC motors, that turn the eccentric shaft and hereby change the stroke length of the pump pistons.

This solution has the disadvantage that angular displacement and stroke length are not directly proportional but if a linear displacement of a toothed rod is selected instead, a direct proportionality is provided. As alternative to these two embodiments, the solution may also be designed so that one may adjust the stroke via a spindle driven by a DC motor.

Furthermore, the lubricating apparatus according to a particular embodiment is peculiar in that the setting means includes an eccentric shaft engaging a set pin which is disposed sliding in a recess between the eccentric shaft and the distributor plate of the lubricating apparatus. By providing a set pin which can be displaced, one may change the position at which the distributor plate is stopped.

The lubricating apparatus is made with a hydraulic piston with a diameter corresponding to the diameter of the hydraulic chamber and with a slide rod having lesser diameter and which is in contact with the setting means. This construction enables implementation of an alternative system pressure in a relatively simple way as it is only needed to change the diameter of the slide rod in the hydraulic slide.

The apparatus is typically fed with one kind of cylinder lubricating oil, but in principle the oil supply may be arranged so that one may switch between one or more kinds of cylinder lubricating oils, either manually or automatically. This may be done either for a connected apparatus or for a group of lubricating points. I practice, this may be done manually with a tap or automatically by means of an electrically controlled solenoid valve which may possibly also be controlled via the computer system/electronic control unit.

The central computer of the computer system establishes a control for the lubricating apparatus according to the invention. According to a special embodiment, the central computer comprises two PCs: A main PC and a backup PC. Besides, there is provided a local control unit associated with and controlling one or two lubricating apparatuses. The local control unit controls the stroke and the timing for the associated lubricating apparatus or apparatuses.

The control is made so flexible that all current operational modes can be applied:
- rpm-dependent regulation, i.e. unregulated operation;
- bhp-dependent regulation, i.e. load dependent regulation of the amount of lubricating oil;
- mep-dependent regulation, i.e. cylinder pressure dependent regulation of lubricating oil; or
- load change dependent regulation, i.e. extra lubrication in connection with changes in load.

Besides, it is possible to establish a flexible control system enabling a high degree of user specified regulating algorithms, including:
- variants of standard operational modes;
- possibility of regulating algorithms that are entirely or partly based on customer-specific data input, e.g. diverse sensor based data input (FE-content, cylinder pressure, cylinder temperature etc.), where the inputs may be applied to the entire engine or to the individual cylinder;
- possibility of overlay modes where the user defines and describes reduction and/or increase percentages by himself.

According to a particular embodiment, the method according to the invention is peculiar in that the computer control is performed with a local control with the possibility of performing a local data collection in/at the individual cylinder and a superior control with the possibility of controlling the delivered amounts of lubricating oil corresponding to the expected/planned amounts of lubricating oil.

The decentralized computers/control units establish a local control whereby the user furthermore has the possibility of performing a local data collection in/at the individual cylinder and using these online data inputs for adjusting supply amounts and possible timing. One may e.g. mount temperature sensors in the cylinder and flowmeters on the fuel supply for individual cylinders and subsequently define how the local control of the decentralized computer is to regulate timing and amounts in relation thereto.

To this is added that the decentralized computer may be used for gathering local information about conditions for individual cylinders; e.g. it will be possible to mount flowmeters and/or temperature sensors in individual lubricating apparatuses, and via the network supply this information about conditions to the superior control of the central computer, in that way achieving the possibility of e.g. checking if the supplied amounts of lubricating oil correspond to the expected/planned amounts of lubricating oil.

According to a further embodiment, the lubricating apparatus according to the invention is peculiar in that it is sectioned, e.g. in groups of 2-4 blocks, each group having a distributor plate, and which may be replaced individually, and that a plurality of valve sets are mounted whereby different activation times for each block are enabled.

As mentioned, there are advantages of sectioning the lubricating apparatus as this provides the possibility of setting different activation times in each of the blocks provided at the sectioning of the lubricating apparatus.

According to yet an embodiment, the lubricating apparatus according to the invention is peculiar in that the hydraulic pistons are provided in groups, that each group is arranged for displacing the distributor plate for activating the dosing pistons, and that each group of hydraulic pistons each have their individual stroke so that individual quantity adjustment of lubricating oil is achieved, depending on the group of hydraulic pistons that are activated.

This may be effected in that each group of hydraulic pistons operates with its own stroke so that when a first group of pistons is activated, a first stroke length occurs, and when a second group is activated, a second stroke length occurs. The amount of lubricating oil may thus be regulated by making an algorithm. The algorithm may be adapted so that by combining the use of two or more stroke lengths, an approximately stepless quantitative adjustment is attained within the stroke range.

This principle is thus based on the fact that two or more types of hydraulic pistons are used, where a first group of hydraulic pistons can be extended up through the distributor plate, thereby preventing the distributor plate from going to an extreme position. When a second piston group is activated, the distributor plate may be moved to the extreme position and be stopped by the base block.

It is noted that in each group of hydraulic pistons there may be two or more pistons. Hereby it is ensured that displacement of the distributor plate is effected, even if a piston in a group fails.

According to a further embodiment, the method according to the invention is peculiar in that in case of failure in a valve, a shift between valves is established. These shifts may either be a shift between two (or more) groups of hydraulic pistons, or shifts enabled by having several sets of valves that double each other and control the same group.

As part of the local control, there is incorporated possibility of doubling the valves for controlling the timing. This may e.g. be applied in case that a lubricating apparatus does not "strike" as a result of a failing valve, and then switches to another valve. The latter error status may e.g. be identified by the condition that none of the pistons of the lubricating apparatus are "striking" in spite of the engine still running.

By this principle, e.g. two sets of solenoid valves may be used simultaneously. This requires that each solenoid valve drives a group of hydraulic cylinders independently of the other hydraulic cylinders. If a situation with a solenoid valve sticking or malfunctioning arises, the operation of the apparatus will continue unaffected. At the same time it will be possible that while the lubricating apparatus is operating, one pressure line in the dosing system may be shut off in order to replace a failing solenoid valve.

Failure of one valve will thus not disturb the general operation of the apparatus and maintenance replacement of valves may be performed while the apparatus is in operation.

Alternatively, there may be used a multi-way valve for controlling a group of hydraulic pistons. In such a situation it may be sufficient with one valve unit per group of hydraulic pistons instead of two, as mentioned in the above embodiment where two sets of solenoid valves are used.

The decentralized computer may be provided in a local control unit which may be provided with local operation so that one shifts from "Automatic" to "Manual Operation". By "Manual Operation" the system may run either timed or untimed, and the stroke length may either be extended or be reduced directly on the unit. In this way, a further level of redundancy is always incorporated.

A lubricating system may have a number of lubricating apparatuses, one per cylinder, each controlled by a separate local control unit. The system may have two separate sets of sensors mounted on the flywheel, enabling timing of the system. Moreover, the system has a need for a signal which is proportional to the load on the engine. This may either be supplied by a sensor/pickup unit, or be supplied directly by a signal from an engine interface.

The lubricating apparatuses may be driven hydraulically via a redundant pump unit. The central computer is only needed for logging data and central operational control. All local control units have integrated control panels and operate independently, and a redundant network is only used for non-vital operation data and data logging. Alarms may be reported directly from each unit.

DESCRIPTION OF THE DRAWING

The invention will then be explained in more detail with reference to the accompanying drawing, where.

DETAILED DESCRIPTION OF THE INVENTION

Figures 1A, 1B:
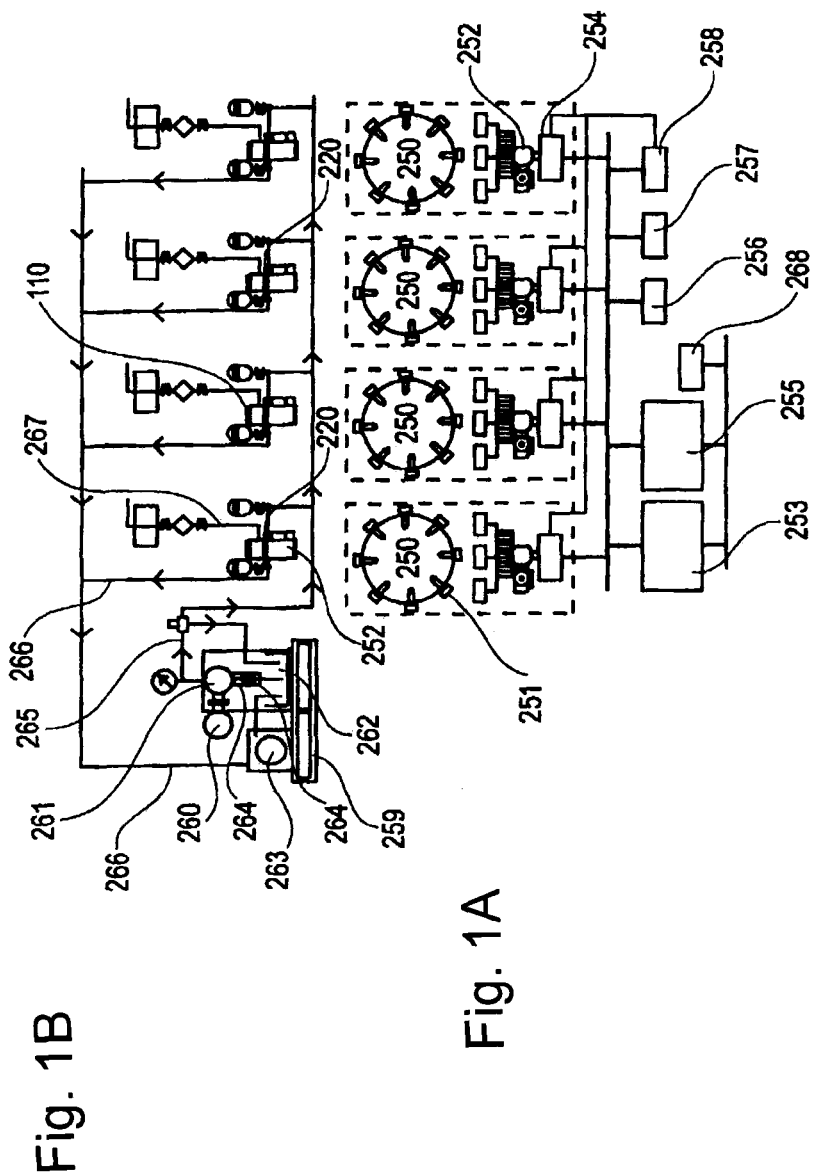
FIG. 1 shows a schematic overview of a system with a plurality of lubricating apparatuses according to the invention.

FIG. 1 shows schematically four cylinders 250 and on each cylinder appears eight injection nozzles 251. The lubricating apparatuses 252 are connected with a central computer 253, with local control units 254 typically for each single lubricating apparatus 252. The central computer 253 is coupled in parallel with a further control unit 255 constituting a backup for the central computer. In addition, there is established a monitoring unit 256 monitoring the pump (can be a hydraulic pump or a hydraulic station), a monitoring unit 257 monitoring the load and a monitoring unit 258 monitoring the position of the crankshaft.

In the upper part of FIG. 1 there is shown a hydraulic station 259 comprising a motor 260 driving a pump 261 in a tank 262 for hydraulic oil. The hydraulic station 259 furthermore includes a cooler 263 and a filter 264. System oil is pumped via supply line 265 on to the lubricating apparatus via a valve 220. The hydraulic station is furthermore connected with a return line 266 which is also connected with the lubricating apparatus via a valve.

Lubricating oil is forwarded to lubricating apparatus 252 via a line 267 from a lubricating oil supply tank (not shown). The lubricating oil is forwarded from the lubricating apparatus via lines 110 to the injection nozzles 251.

Figure 2:
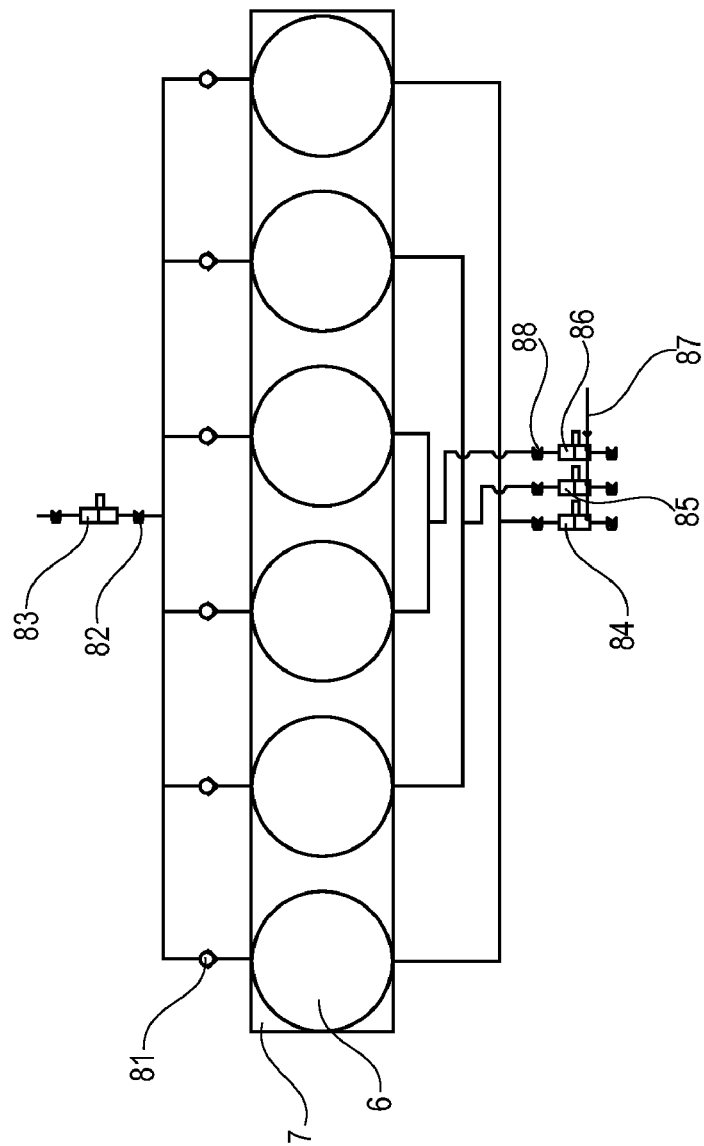
FIG. 2 shows a schematic drawing of a first embodiment with an elongated distributor plate.

FIG. 2 shows a lubricating apparatus called an "Independent Multi-Piston Linear Lubricator" having an elongated distributor plate.

When the lubricating apparatus is in use with a vertically oriented housing, a vertical displacement of a rectangular surface will occur by means of mutually independent hydraulic pistons.

Pos. 6 shows hydraulic pistons that are connected in groups of two or more hydraulic pistons. The various hydraulic groups of hydraulic pistons are independent of each other.

Pos. 80 shows a distributor plate which is pushed by the hydraulic pistons 6 at one side and which acts on the dosing pistons 21 on the other side. By blocking dosing or hydraulic pistons, the distributor plate 80 may capsize, and it is possible to design the distributor plate in such a way which provides that capsizing will not be a problem. Alternatively, it may be necessary to control the distributor plate 80, either directly or indirectly.

Pos. 81 shows non-return valves that may possibly be added in cases where only a solenoid valve 83 is applied at the return/tank side. Typically, an outlet will require 2×2 sets of solenoid valves where each group of hydraulic pistons are controlled by a solenoid valve 84 at the pressure side and a solenoid valve 83 at the return side.

Pos. 82 and 88 show taps enabling replacement of a solenoid valve during operation.

Pos. 83 shows a solenoid valve at return/tank side.

Pos. 84-86 show solenoid valves that each control a group of hydraulic pistons 6.

Figure 3:
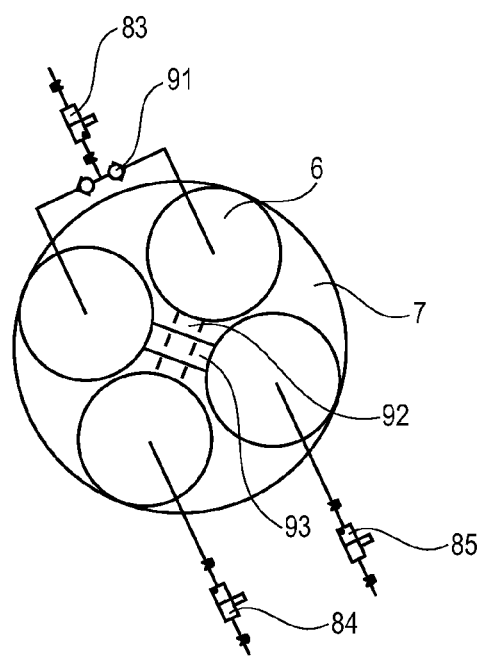
FIG. 3 shows a schematic drawing of a second embodiment with a circular distributor plate.

FIG. 3 shows a second embodiment of a lubricating apparatus called "Independent Multi-Piston Cylindric Lubricator" having a circular distributor plate.

When the lubricating apparatus is in use with a vertically oriented housing, a vertical displacement of a circular surface will occur by means of mutually independent hydraulic pistons.

Pos. 6 shows hydraulic pistons that are connected in groups of two or more hydraulic pistons. The various hydraulic groups of hydraulic pistons are independent of each other.

Pos. 83 is a solenoid valve at return/tank side.

Pos. 84-85 show solenoid valves that each control a group of hydraulic pistons 6. At the pressure side, the solenoid valve is connected to the hydraulic system where the same hydraulic system, or possibly two mutually independent hydraulic systems, may be used.

Pos. 90 shows a distributor plate which is pushed by the hydraulic pistons 6 at one side and which acts on the dosing pistons 21 on the other side. By blocking dosing or hydraulic pistons, the distributor plate 80 may capsize, and therefore it is possible to design the distributor plate in such a way that capsizing will not be a problem; alternatively, it may appear necessary to control the distributor plate 90 either directly or indirectly.

Pos. 91 shows non-return valves that may possibly be added in cases where only one solenoid valve 83 is applied at the return/tank side. Typically, an embodiment will require 2×2 sets of solenoid valves where each group of hydraulic pistons are controlled by a solenoid valve 84 at the pressure side and a solenoid valve 83 at the return side.

Pos. 92 and 93 show a connecting channel between two hydraulic pistons which thereby enable a group of hydraulic pistons.

Figure 4:
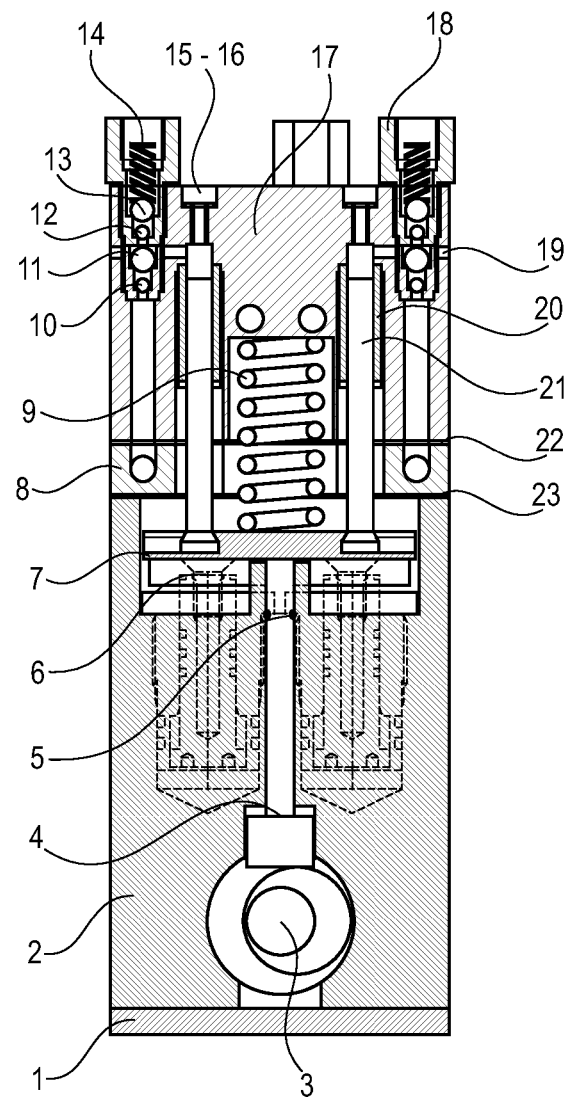
FIG. 4 shows a sectional view through an embodiment of a lubricating apparatus according to the invention.

FIG. 4 shows a cross-section through a lubricating apparatus according to the invention.

Pos. 1 shows a bottom plate with a packing that enables mounting of set pin 4 which is fastened with a screw from below.

Pos. 2 shows a base block with a number of hydraulic pistons 6.

Pos. 3 shows an eccentric shaft whereby the stroke may be regulated by activating a DC motor 27. Alternatively, the stroke length may also be regulated by a spindle, see FIG. 8.

Pos. 4 shows a set pin which is used as an adjustable stop whereby the stroke can be regulated as displacement of set pin 4 may change the point at which the distributor plate 7 is stopped.

Pos. 5 shows a packing around set pin 4 ensuring that possible leaking oil does not run down into the eccentric housing. One may possibly omit the O-ring 5 in the shown design and instead move possible leak oil away from the cavity around the eccentric shaft 3.

Pos. 6 shows a hydraulic piston which at one side "pushes" the distributor plate 7 and at the other side is acted on by the hydraulic system oil pressure from the pressure supply ducts 61 and 62, respectively. Note that the said ducts are independent of each other. The shown design has two groups of hydraulic pistons, each of these groups in the shown design consisting of two hydraulic pistons, but it is also possible to have more than two hydraulic pistons in one group.

Pos. 7 shows the distributor plate which is pushed by the hydraulic pistons 6 at one side and which acts on the dosing pistons 21 at the other side. By blocking dosing or hydraulic pistons, the distributor plate 7 may capsize, and it is possible to design the distributor plate in such a way providing that capsizing will not be a problem—alternatively it may appear necessary to control the distributor plate 7 either directly or indirectly.

Pos. 8 shows an intermediate plate which is mainly used for conducting the lubricating oil to a pump block 17 and to enable a more flexible fastening of the pump block.

Finally, the intermediate plate also ensures that, if desired, one may divide the pump block into sections without leakage taking place.

Pos. 9 shows a spring which in the shown construction is a return spring. There is only one common return spring in the shown construction, but in principle one may also envisage that every dosing piston has its own return spring.

Pos. 10-13 show double suction and pressure valves where the lubricating oil is fed to the pump chamber in front of the dosing piston 21. When the individual lubricating point goes from suction to pressure stroke, the suction valves 10 and 11 and pressure valves 11 and 12 are opened when the pressure in the pump chamber in front of the pistons 21 is sufficiently high to overcome the compression spring 14.

Pos. 14 shows a pressure spring ensuring that the feed pressure of the lubricating oil cannot seep/run directly through the apparatus without control of the precise amount. In some cases, it may be an advantage to use a stronger compression spring as the delivery time for the lubricating oil may be relatively much reduced thereby. Normally, the compression spring is designed according to the pressure level in the lubricating oil supply 267, but in cases where a faster lubricating stroke performance is desired, the non-return valve 13 may advantageously be designed so that a higher pressure is to be built up for opening, thereby forcing a quicker delivery of the lubricating oil.

Pos. 15-16 show venting screw with packing.

Pos. 17 shows a pump block that may consist of one or more lubricating points. Typically, the apparatus is made with six or more lubricating points. It is possible that sectioning of the pump block 17 can be necessary, as replacement of possible failing components will be easier.

Pos. 18 shows a housing for pressure valves 12 and 13 and compression spring 14, and at the same time connection to the supply pipes is enabled.

Pos. 19 shows a blind plug closing the working channel between the pump chamber and the suction and pressure valves.

Pos. 20 shows a pump cylinder in which pump piston 21 is mounted.

Pos. 21 shows a pump piston for the dosing piston.

Pos. 22 shows a packing between the pump block 17 and the intermediate plate 8.

Pos. 23 shows a packing between the intermediate plate 8 and the base block 2.

Figure 5:
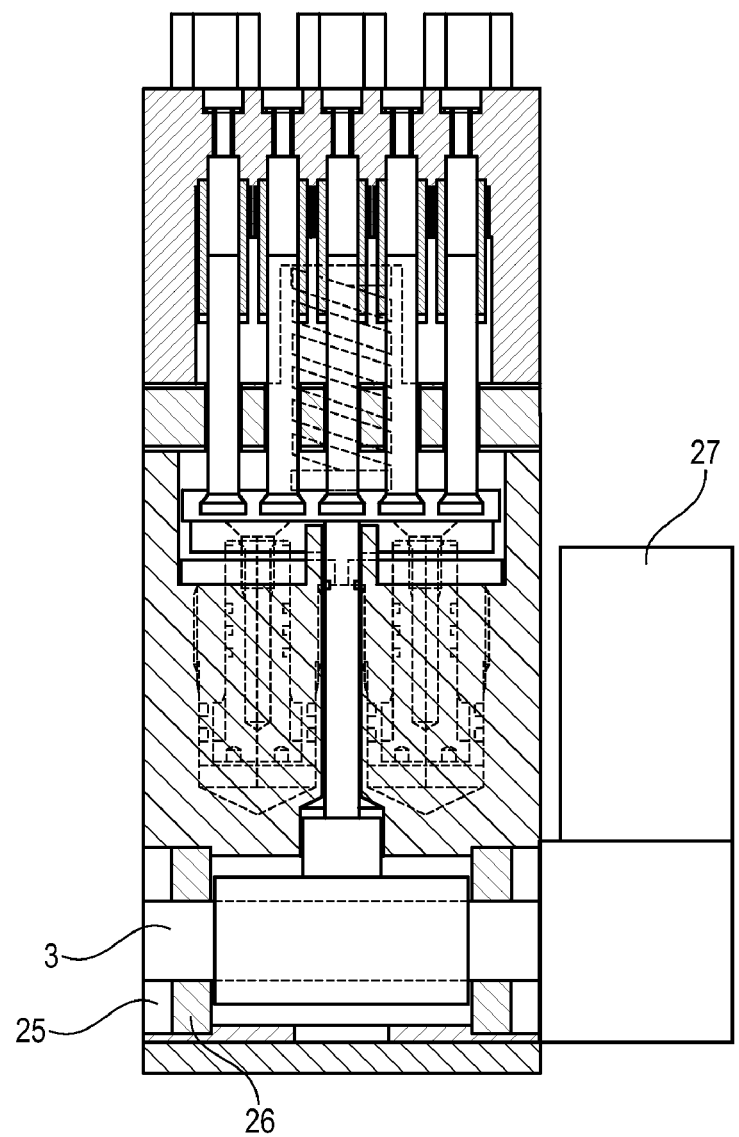
FIG. 5 shows a sectional view through a lubricating apparatus shown at right angle to the section in FIG. 4.

FIG. 5 shows a section through the lubricating apparatus according to the invention in FIG. 4 and with adjustment of stroke by a spindle and a DC motor.

Pos. 3 shows the eccentric shaft that enables stroke adjustment. Furthermore, it will be relatively easy to establish a stroke reading scale by mounting a scale at the side of the base block 2, thereby using the eccentric shaft position for reading the stroke length directly.

Pos. 25 shows a sealing ring ensuring that possible leak oil cannot run out and simultaneously ensuring that dirt cannot come in.

Pos. 26 shows a bearing which controls the eccentric shaft 24.

Pos. 27 shows a DC motor, possibly with worm drive, which, depending on control signals, changes the position 24 of the eccentric shaft. An encoder or other system for controlling the stroke is mounted on shaft. This encoder is not shown on the depicted Figure.

Figure 6:
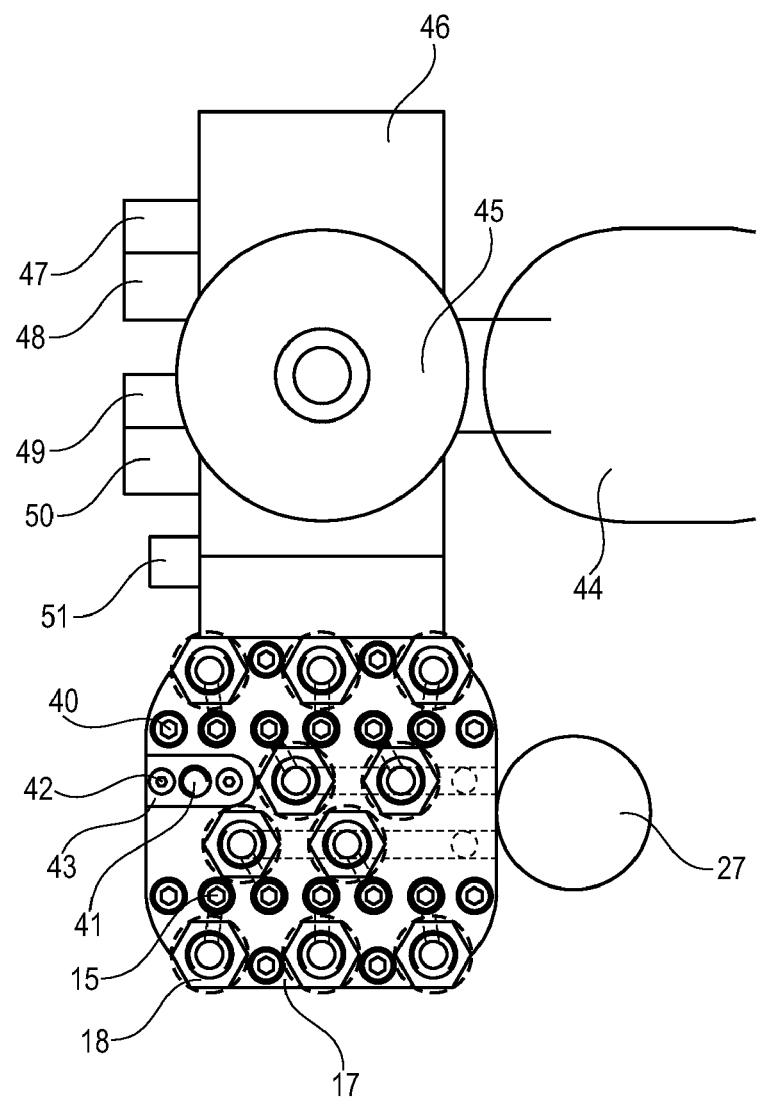
FIG. 6 shows a plan view of the lubricating apparatus shown in FIGS. 4 and 5.

FIG. 6 shows a plan view of the lubricating apparatus according to the invention with supply block and DC motor. The Figure shows the embodiment where there are four hydraulic pistons divided into two groups.

Pos. 40 shows a mounting screw for fastening pump block 17 to the intermediate plate 8.

Pos. 41 shows a sensor detecting when the distributor plate 7 is in top position. The sensor is mounted on a fitting 43 so that it may be removed quickly if the pump block 17 is to be replaced.

Pos. 42 shows a screw for fastening sensor/fitting 41 and 43.

Pos. 43 shows a fitting for mounting the sensor 41.

Pos. 44-45 show accumulators at pressure and return sides, respectively, which are connected with the solenoid valves 47-50.

Pos. 46 shows a supply block through which the hydraulic oil is supplied/removed and through which the lubricating oil is conducted on to the base block 2.

Pos. 47 shows a solenoid valve for the return side of the hydraulic oil pressure. In group with solenoid valve 48.

Pos. 48 shows a solenoid valve for the pressure side of the hydraulic oil pressure. In group with solenoid valve 47. The solenoid valves 47 and 48 control one group of hydraulic pistons.

Pos. 49 shows a solenoid valve for the return side of the hydraulic oil pressure. In group with solenoid valve 50.

Pos. 50 shows a solenoid valve for the pressure side of the hydraulic oil pressure. In group with solenoid valve 49. The solenoid valves 49 and 50 control the other group of hydraulic pistons.

Pos. 51 shows a screw joint for supplying lubricating oil conducted through the base block 2 and through the intermediate plate 8 to the pump block 17.

Figure 7:
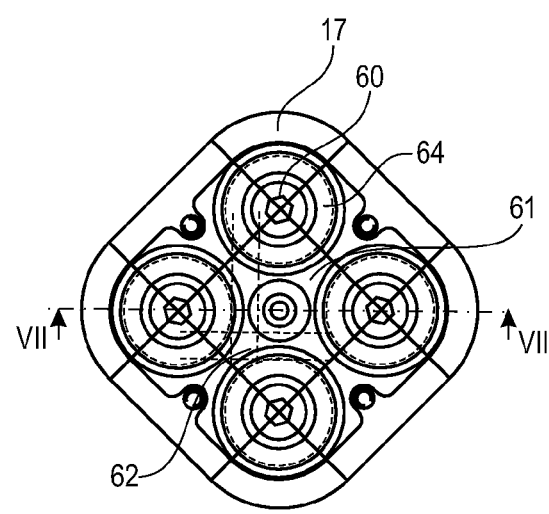
FIG. 7 shows a plan view of the base block shown in FIG. 4.

FIG. 7 shows a plan view of the base block shown in FIG. 6. The Figure shows the embodiment where there are four hydraulic pistons divided into two groups.

Pos. 60 shows a screw fastening the top of the hydraulic piston 6 to the piston 64 itself.

Pos. 61 shows a connecting channel between the two hydraulic pistons which are in one group.

Pos. 62 shows a connecting channel between the two hydraulic pistons which are in the other group.

Figure 8:
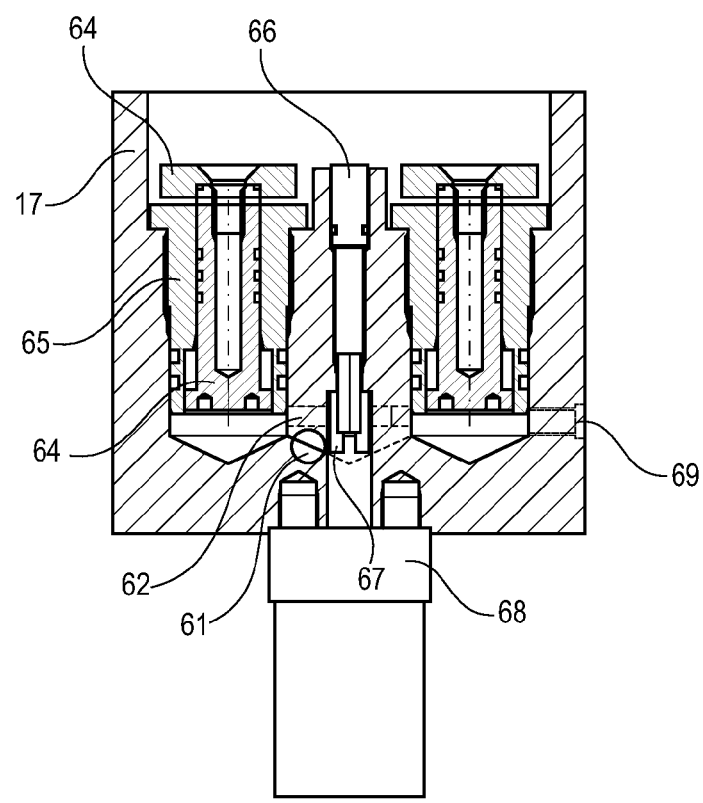
FIG. 8 shows a section through the base block shown in FIG. 7 according to the arrows VII-VII.

FIG. 8 shows a sectional view through the base block shown in FIG. 7 with adjustment of the hydraulic piston and alternative regulation of stroke setting.

Pos. 64 shows hydraulic piston with piston packings.

Pos. 65 shows a hydraulic cylinder in which the hydraulic piston 64 is mounted.

Pos. 66 shows a set pin/spindle which is an alternative embodiment of the stroke adjustment. The solution functions in that a DC motor 68 rotates a shaft which through a thread in the base block moves the top of set pin 66 up or down, depending on the direction of rotation.

Like the other stroke adjusting method, the solution has also the advantage that the hydraulic system pressure does not affect the adjustable stop/set pin 66 and may thereby be dimensioned otherwise than in the above mentioned previous DK patent application.

Pos. 67 shows a coupling part connecting set pin 66 and DC motor 68.

Figure 9:
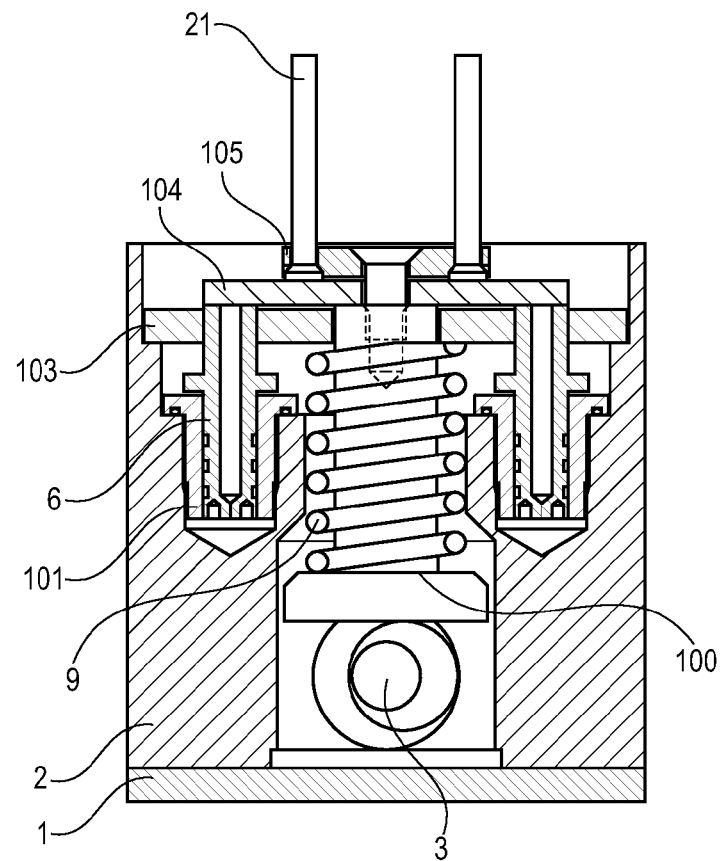
FIG. 9 shows an alternative embodiment of a base block with common stroke stop as well as stroke limitation.

FIG. 9 shows an alternative embodiment of a base block 2 using common stroke stop as well as stroke limitation.

The hydraulic pistons 102 are limited by the distributor plate 104 and by the common stop 103 for all the hydraulic pistons at the other end, respectively. The stroke is adjusted via an eccentric shaft 3 which is fastened on the distributor plate 104 so that the return spring 100 returns the hydraulic pistons 102 and the dosing pistons 21 when the lubricating stroke has been performed.

The fixing cover 105 ensures that the dosing pistons "follow down" when the lubricating stroke is finished. The cover is designed so that the dosing pistons 21 may move a bit.

Figure 10:
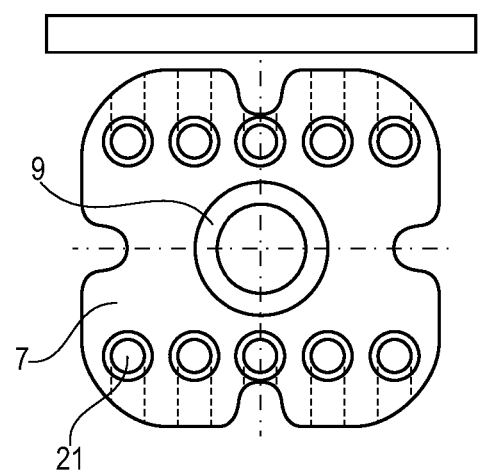
FIG. 10 shows a detail of the distributor plate shown in FIG. 4.

FIG. 10 shows a detailed view of distributor plate 7.

Pos. 7 shows a distributor plate with grooves into which the individual dosing pistons 21 are displaced.

Pos. 9 shows a return spring between the distributor plate 7 and the pump block 17.

Pos. 21 shows dosing pistons.

Figure 11:
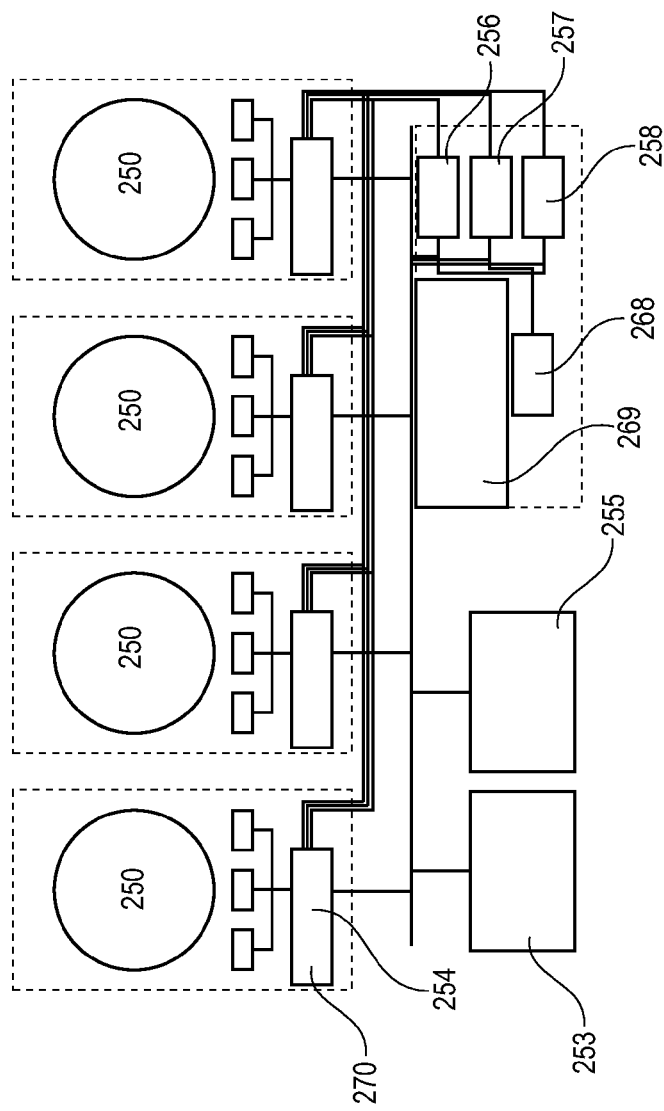
FIG. 11 shows a schematic drawing corresponding to the schematic overview shown in FIG. 1 of a system according to the invention.

FIG. 11 shows an overview practically corresponding to the system shown in FIG. 1. In addition is shown pos. 268 which is interface for the marine engine control and the central user interface 269 and the local user interface 270, respectively.

Figure 12:
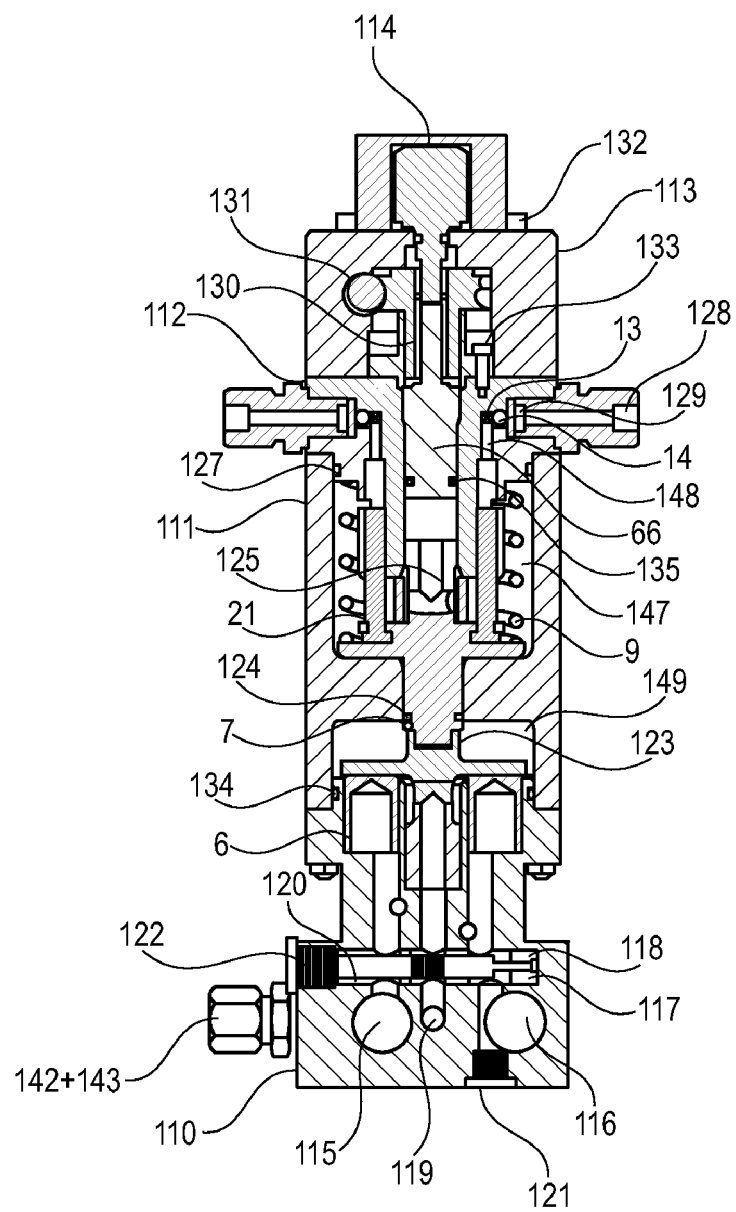
FIG. 12 shows a sectional view through a further embodiment of a lubricating apparatus according to the invention.

FIG. 12 shows a further embodiment of a lubricating apparatus according to the invention.

The lubricating apparatus is made up of a bottom part 110 where solenoid valves 115 and 116 for activating the apparatus are mounted. At the side of the bottom part 110, screw joints are provided for system oil pressure supply 142 and system oil pressure return to tank 143.

The driving oil may be supplied through two solenoid valves, of which one is a primary solenoid valve 116 and the other is a secondary solenoid valve 115.

Figure 15:
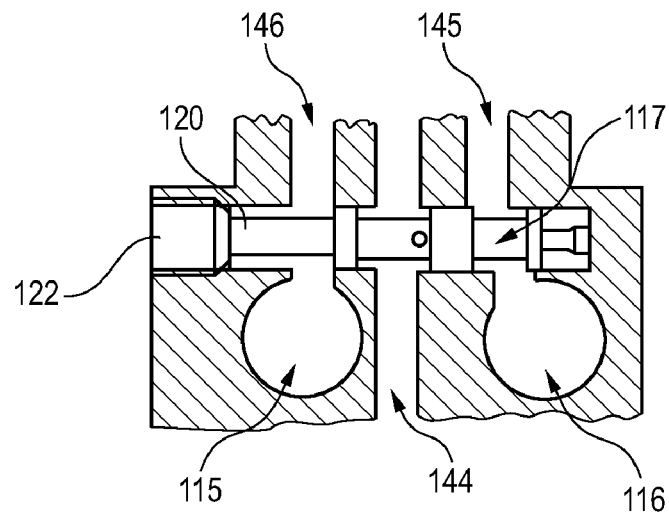
FIG. 15 shows a sectional view for illustrating a switch valve used in the lubricating apparatus shown in FIG. 12.

In the initial position, it is the primary solenoid valve 116 which is active. The driving oil is hereby conducted from the associated supply screw joint 142 to the primary solenoid valve 116 and via a switch valve 117 into the apparatus through a distribution channel 145 to the group of associated hydraulic pistons. This situation is shown in FIG. 15.

Figure 16:
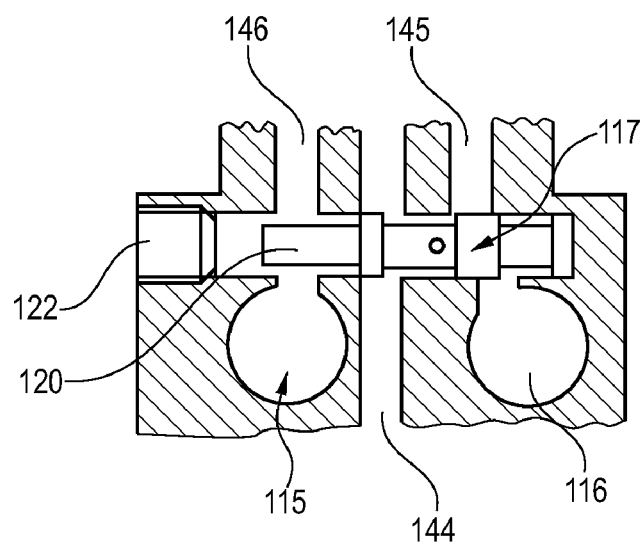
FIG. 16 shows a sectional view corresponding to FIG. 15, but with the switch valve in another position.

In case that the primary solenoid valve 116 fails it is possible automatically to connect the secondary solenoid valve 115. This valve is connected by activating the secondary solenoid valve 115. This situation is shown in FIG. 16.

The associated distribution channel 146 is hereby pressurized. This pressure entails that the switch valve 117 is displaced to the right, whereby the connection between the primary solenoid valve 116 and the associated distribution channel 145 is interrupted. The pressure is hereby removed from the hydraulic pistons connected to this solenoid valve 116.

By activating the secondary solenoid valve 115, the associated distribution channel 146 and the associated hydraulic pistons are pressurized. This causes that the distribution plate 7 is then driven by the oil conducted into the apparatus via the secondary solenoid valve 115.

The switch valve 117 may be equipped with a spring 119. In case of lack of supply pressure through the secondary solenoid valve, the spring will thus automatically put the switch valve 117 back to the above initial position.

The switch valve may be equipped with a restrictor so that this returning of the switch valve can be delayed. In this way is avoided/restricted that the switch valve 117 goes back and forth between the activations. On FIG. 12, the restriction is determined by a slot formed between a drain-pin 118 and the switch valve 117.

When each of the solenoid valves is connected to a separate group of hydraulic pistons, independence between the solenoid valves is ensured. When shifting between the primary solenoid valve 116 and the secondary solenoid valve 115, the switch valve 117 will ensure that the pressure is removed from the primary group of hydraulic pistons and thereby enable operation of the secondary solenoid valve 115, even in cases where the primary solenoid valve is blocked.

Pos. 121 shows a blanking screw.

Pos. 122 shows a combined blanking screw/end stop that partly act as end stop for the pawl 120 of the switch valve 117 and partly has a sealing function also via a (not shown) packing.

Above the hydraulic pistons 6 there is a distributor plate 7. The plate is shown here as a two-part design with an upper distributor plate member 125 and a lower distributor plate member 123. The dosing pistons 21 are mounted in/on the upper distributor plate member 125. In apparatuses where various oils are used for drive and lubrication, there is a piston packing 124 between the upper and lower distributor plate member. In principle, one may also suffice with using one kind of oil for drive oil as well as for lubricating oil.

Around the dosing pistons 21 there is a common return spring 9 which returns the pistons 21 after disconnecting the supply pressure on the hydraulic pistons 6. Around the return spring 9 there is a small lubricating oil reservoir 147 which is externally delimited by a base block 111. The lubricating oil is supplied through a separate screw joint with packings 138 and 139. The apparatus may optionally be equipped with a venting screw with packing 15 and 16.

Above the base block 111 the cylinder block 112 is located where the dosing pistons 21 are disposed for their reciprocating movement. Above the dosing pistons 21 there is a pump chamber 148. In this chamber there is an outlet with a non-return valve ball 13 which is biased by a spring 14. Furthermore, there is provided a screw joint 128 connected directly with the non-return valves/SIP valves in the cylinder wall.

For adjusting the stroke, in this embodiment there is shown an arrangement with a motor 132 coupled to a worm drive 131 which via a worm wheel 130 adjusts the stroke by changing the position on set pin/set screw 66.

In this embodiment, it is possible to adjust the stroke by changing the position of the stroke stop. This is different from the previous embodiment where a fixed point of origin was used and where the stroke was adjusted subsequently.

In order to control the actual stroke length, a sensor/pickup unit 114 is mounted in continuation of set pin/set screw 66 for detecting the stroke, e.g. in the form of an encoder or a potentiometer.

Pos. 113 shows a housing for the set pin/set screw arrangement.

Pos. 124 shows a piston packing sealing between the two spaces 149 and 147 with leak oil bypassing the hydraulic pistons 6 at the drive oil side at the bottom and the lubricating oil at the top, respectively.

Pos. 127 shows an O-ring sealing between the base block 111 and the cylinder block 112.

Pos. 133 shows a fastening screw for fastening a bearing case for the worm wheel 130.

Pos. 134 shows an O-ring sealing between the bottom plate 110 and the base block 111.

Figure 13:
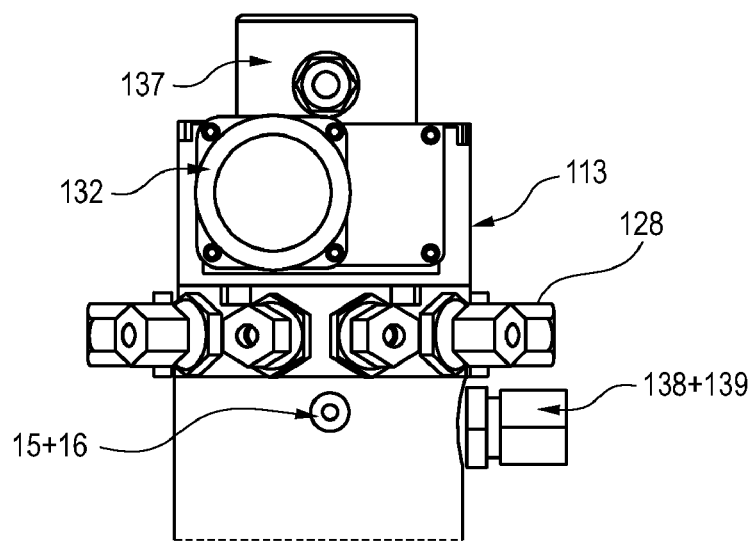
FIG. 13 shows a partial view of a detail of the lubricating apparatus shown in FIG. 12.

FIG. 13 shows a partial side view of a detail at the lubricating apparatus shown in FIG. 12 as seen from the opposite side compared with FIG. 12.

Pos. 15 shows a venting screw with a packing 16.

Pos. 132 shows the DC motor used for adjusting the stroke via worm drive and worm wheel 130, 131 as shown in FIG. 4.

Pos. 137 shows a housing for sensor/pickup unit 114.

Pos. 138 shows a filling screw joint with a packing 139.

Figure 14:
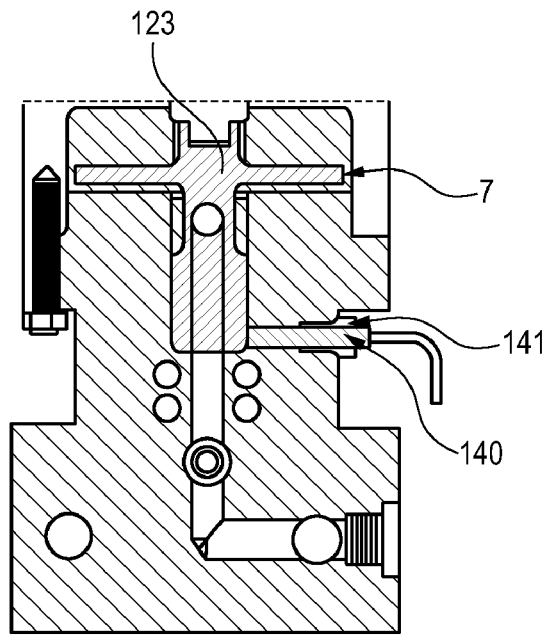
FIG. 14 shows a sectional view for illustrating a sensor used in the lubricating apparatus shown in FIG. 12.

FIG. 14 shows a sectional view for illustrating a sensor 140 used for detecting the movement of the distributor plate 7. The sensor 140 is disposed in a hole with screw joint 141 for sealing the hole.

In case of delayed or missing feed-back from the sensor 140, a local control unit 254 will shift to the secondary solenoid valve 115 after a predetermined period of time with indication of failure and at the same time report to the central computer 253.

Figure 17:
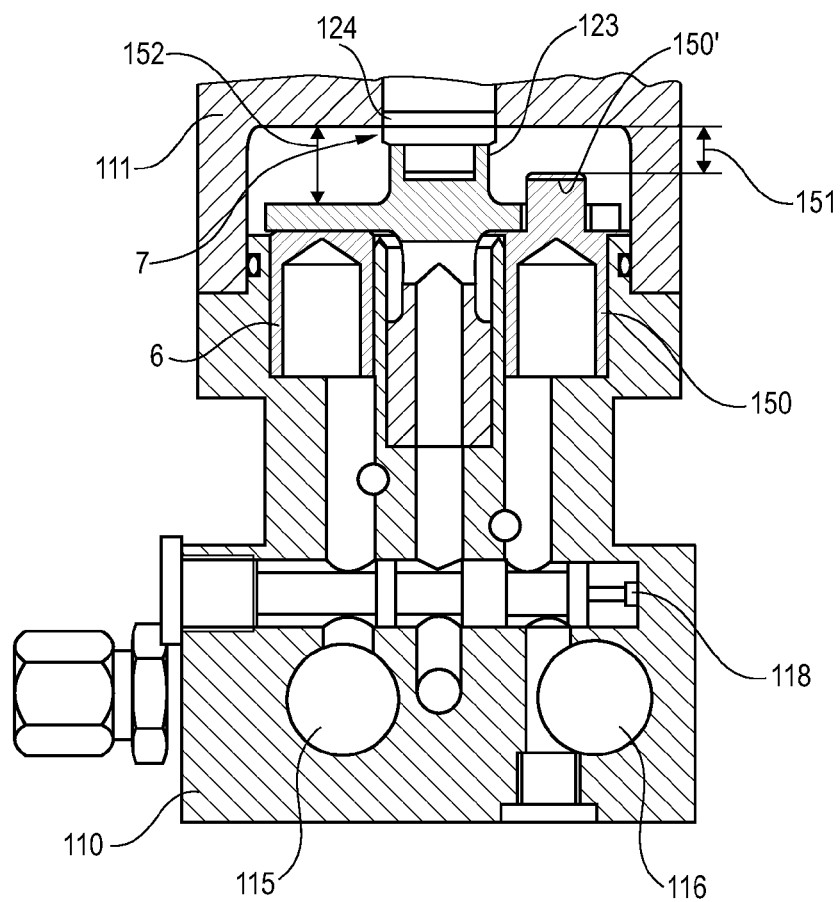
FIG. 17 shows a partial section through a further embodiment with alternative quantity adjustment of the amount of cylinder lubricating oil via various groups of hydraulic cylinders.

In FIG. 17 is shown a partial section through an alternative embodiment where it is possible to establish an alternative adjusting of quantity and cylinder lubricating oil.

Here, different groups of hydraulic pistons are used for regulating amounts of lubricating oil. In the shown embodiment is illustrated two different types of hydraulic pistons 6 and 150, but there may be a plurality of groups with different pistons.

Each group of hydraulic pistons operates with each their stroke length. When one group of pistons 150 is activated, then there will be a stroke 151. When the other group of pistons 6 is activated, then there will be a stroke 152.

The amount of lubricating oil may thus be regulated by making an algorithm combining the use of the two strokes 150 and 151. Thus may be established an approximately stepless adjusting of the quantity of the lubricating oil within the range of the strokes 151 and 152.

The shown principle operates in that pistons in one group of pistons 150 are extended with a pin 150' extending through a hole in the distributor plate 7, thereby preventing the distributor plate 7 from going to its extreme position. When the pistons in the second piston group 6 are activated, the distributor plate 7 will move to the extreme position and be stopped by the base block 111.

The lubricating apparatus has the following operational mode:

The lubricating apparatus has, as mentioned, two built-in solenoid valves. When a pumping cycle starts, solenoid valve 20 opens and the system pressure (typically between 40 and 120 bar) is fed into the apparatus and pressurizes the hydraulic chamber.

By applying pressure, the hydraulic piston is moved to the bottom, and together with this piston the dosing piston for lubricating oil is also forced to the bottom, and the lubricating oil in the space in front of the dosing piston is pressed out through a non-return valve with spring loading.

After the dosing-piston has reached a bottom position and activated a position sensor, the superior control may register the sensor and check whether the stroke has been performed.

The solenoid valve then closes at the inlet side, and after a defined time the solenoid valve opens at the outlet side and the pressure is removed. Spring is pressing on the distributor plate, thereby pressing the hydraulic pistons to the original position, and at the same time new lubricating oil is sucked into the cylinder chamber of the dosing unit.

The stroke length for the dosing pistons can be adjusted electronically by turning an eccentric shaft. In order to ensure regulation of the stroke by means of the eccentric shaft, a set pin is disposed between the latter and the distributor plate.

Each lubricating point has a venting screw so that possible air in the cylinder chamber of the dosing unit can be removed hereby.

If any system or lubricating oil should leak past respective pistons, this leak oil is gathered and may be drained off in total from the lubricating apparatus.

The invention claimed is:

1. A hydraulic lubricating apparatus for a dosing system for cylinder lubricating oil,
    a supply line and a return line connected with the lubricating apparatus via one or more valves for supplying hydraulic oil;
    a central hydraulic oil feed pump which via the supply line is connected with hydraulic cylinders each having a hydraulic piston and which may be subjected to pressure by hydraulic oil;
    a number of injection units corresponding to a multiple of the cylinder number in the engine, and which are connected with each their dosing cylinder with a dosing piston;
    a supply line for cylinder lubricating oil;
    a distributor plate which at one side is in contact with the dosing pistons;
    wherein the distributor plate is in contact with two or more hydraulic piston at its other side for displacing the distributor plate for actuating the dosing pistons.

2. Lubricating apparatus according to claim 1, wherein the distributor plate is supported by three or more hydraulic pistons.

3. Lubricating apparatus according to claim 1, wherein the dosing pistons are disposed in parallel with each other and that the distributor plate is displaced in direction perpendicular to the dosing pistons.

4. Lubricating apparatus according to claim 1, wherein the hydraulic pistons are provided in groups of two or more, where each group may be used independently of the others.

5. Lubricating apparatus according to claim 1, wherein it includes at least one monitoring sensor for registering the displacement of the distributor plate and/or accomplished dosing of cylinder lubricating oil portion.

6. Lubricating apparatus according to claim 1, wherein all hydraulic cylinders are connected with the same central hydraulic oil feed pump.

7. Lubrication apparatus according to claim 1, wherein the hydraulic cylinders are arranged in groups connected with each their separate hydraulic oil feed pump.

8. Lubricating apparatus according to claim 7, wherein it includes monitoring sensors for each distributor plate.

9. Lubricating apparatus according to claim 1, wherein it includes an adjusting unit with a setting means which via a set pin/set screw engages the distributor plate and thereby the dosing pistons in order thereby to adjust the volume of injected cylinder lubricating oil in each lubricating stroke, and a controllable actuator/motor engaging the setting means for setting the latter.

10. Lubricating apparatus according to claim 1, wherein it includes a computer system/electronic control unit for controlling, monitoring and/or detecting the functions of the lubricating apparatus.

11. Lubricating apparatus according to claim 4, wherein the monitoring sensor includes an induction sensor provided in the lubricating apparatus for detecting the displacement of the distributor plate.

12. Lubricating apparatus according to claim 1, wherein it is sectioned, e.g. in groups of 2-4 blocks, each group having a distributor plate, and which may be replaced individually, and that a plurality of valve sets are mounted whereby different activation times for each block are enabled.

13. Lubricating apparatus according to claim 1, wherein the hydraulic pistons are provided in groups, that each group is arranged for displacing the distributor plate for activating the dosing pistons, and that each group of hydraulic pistons each have their individual stroke so that individual quantity adjustment of lubricating oil is achieved, depending on the group of hydraulic pistons that are activated.

14. A method for dosing cylinder lubricating oil, the method including
 supplying hydraulic oil pressure via a feed and a return of hydraulic oil to and from a lubricating apparatus by using a hydraulic oil supply system connected with hydraulic cylinders that each has a hydraulic piston and which is subjected to pressure by the hydraulic oil;
 supplying and injecting cylinder lubricating oil via a number of injection units corresponding to a multiple of the cylinder number in the engine, which injection units being connected with each their dosing cylinder with a dosing piston;
 that a distributor plate at one of its sides is brought into contact with the dosing pistons
wherein the distributor plate is brought into contact with two or more hydraulic piston at its other side for displacing the distributor plate for actuating the dosing pistons.

15. Method according to claim 14, wherein it includes a computerised controlling, monitoring and/or detecting of the functions of the method.

* * * * *